UNITED STATES PATENT OFFICE.

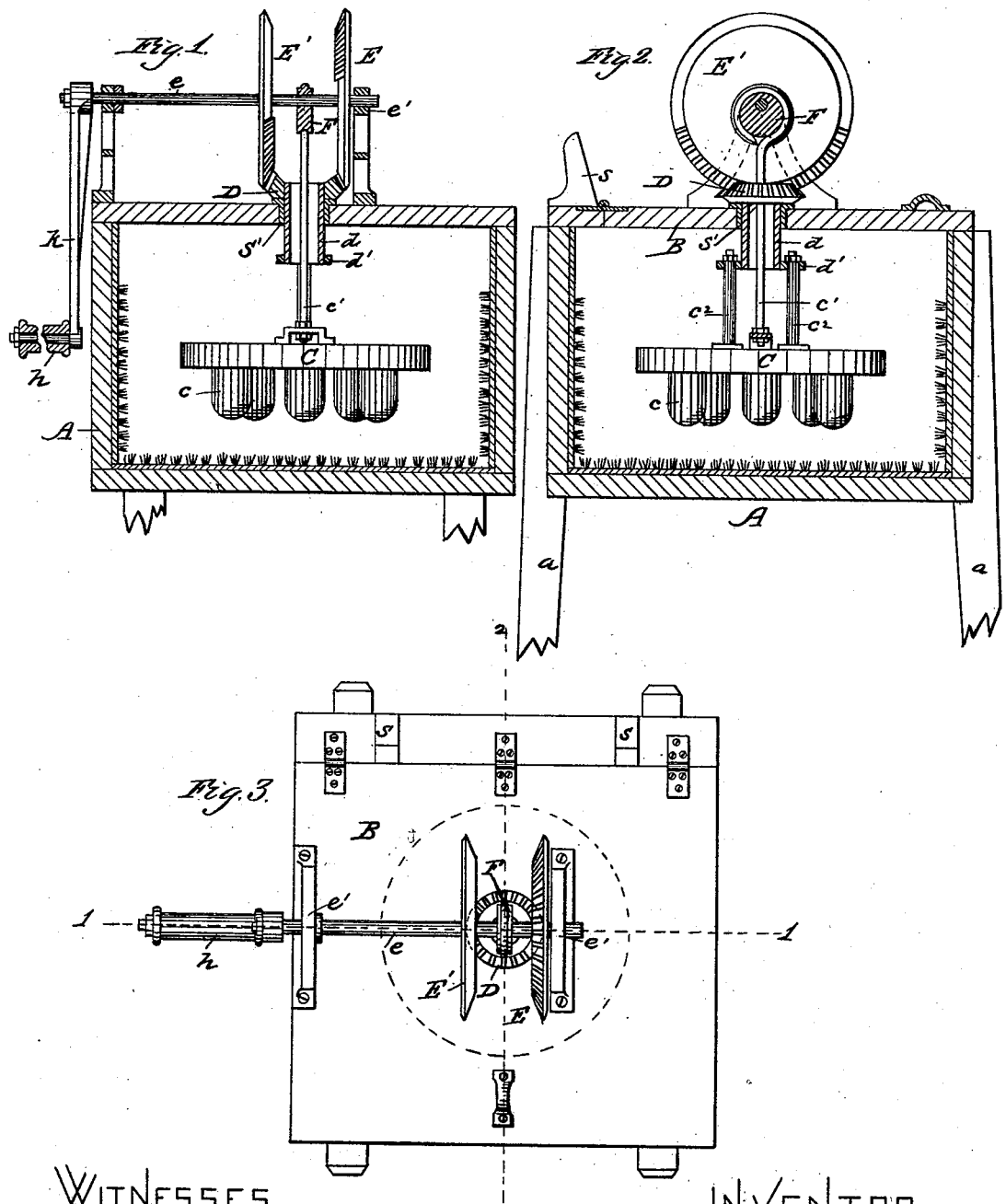

CHARLES A. BENTZEN, OF CHICAGO, ILLINOIS.

MECHANICAL DEVICE.

SPECIFICATION forming part of Letters Patent No. 236,410, dated January 11, 1881.

Application filed November 23, 1880. (No model.)

*To all whom it may concern:*

Be it known that I, C. A. BENTZEN, of the city of Chicago, county of Cook, and State of Illinois, have invented certain Improvements in Mechanical Devices, of which the following is a specification.

My invention relates to a combination of two vertical mutilated bevel-gears upon a horizontal shaft with another bevel-gear upon a vertical shaft, adapted to convert rotary motion of the horizontal shaft into reciprocating circular motion in the vertical shaft; and, further, to the conversion of the rotary motion of the said horizontal shaft into vertical reciprocating motion in a shaft working through the said vertical shaft first above mentioned.

My said improvement will be more fully described with reference to the accompanying drawings, in which—

Figure 1 represents a vertical section of a washing-machine having my improvement in connection therewith, the section being taken as indicated by the broken line 1 1 in Fig. 3; Fig. 2, a like section of the same, taken as indicated by the broken line 2 2 in the same figure, and Fig. 3 a plan of the same.

$e$ indicates the said horizontal shaft, having its bearings in the standards $e'$ $e'$, and to which rotary motion may be imparted in any suitable manner; E and E', two mutilated bevel-gear wheels fixed upon the shaft, and D a horizontal bevel-gear wheel fixed upon its shaft $d$, between the wheels E and E', the series of cogs and the blanks upon each being so arranged that while wheel E will drive the bevel-gear D in one direction the wheel E' will not act upon it at all, and when wheel E' acts upon it and drives it in an opposite direction, then wheel E will not act upon it, so that the hollow shaft $d$ will be revolved about a half-circle in one direction, and then in the other, alternately.

In the drawings, the disk C, having fluted rubbers $c$, is attached to that shaft by means of the frame $c^2$ $c^2$ and $d'$, and takes its motion from the shaft to rub and agitate the clothes and suds contained in box A.

F indicates a fast grooved pulley, fixed upon shaft $e$ eccentrically, and $c'$ is a shaft, which is attached to the disk C at its lower end, and at its upper end it is bent into the form of a ring, and is mounted upon the wheel F and works in the groove therein, and the result of this construction and arrangement is that when the shaft $e$ revolves wheel F turns in the ring of the shaft $c'$ and imparts to it a reciprocating vertical motion, and to the disk C the same motion, of course, so that when the shaft $e$ rotates it imparts simultaneously to the disk C the two kinds of motion specified.

No claim is made herein for the washing-machine shown and described; but the same is described and claimed in my application for a paten' for improvement in washing-machines, filed October 20, 1880.

What I claim as my invention, and desire to secure by Letters Patent, is—

1. The combination of the mutilated bevel-gear wheels E and E' upon the shaft $e$ and the bevel-gear wheel D upon vertical shaft $d$, adapted to convert rotary motion in shaft $e$ into horizontal reciprocating circular motion in shaft $d$, substantially as described.

2. The combination of the grooved fast pulley F, fixed eccentrically upon shaft $e$, and the shaft $c'$, passing down through hollow cylinder, provided with a ring or loop upon its upper end for the wheel F to turn in, adapted to impart reciprocating motion to shaft $c'$, substantially as described.

CHARLES A. BENTZEN.

Witnesses:
FREDERICK C. GOODWIN,
A. BOND.